(12) United States Patent
Stewart et al.

(10) Patent No.: US 10,126,940 B2
(45) Date of Patent: Nov. 13, 2018

(54) TOUCH ZONES ON A SOFT KEYBOARD (71) Applicant: Lenovo (Singapore) Pte. Ltd., Singapore (SG)

(72) Inventors: Aaron M. Stewart, Raleigh, NC (US); Jeffrey E. Skinner, Raleigh, NC (US); Jonathan J. Yu, Raleigh, NC (US); Lance W. Cassidy, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 284 days.

(21) Appl. No.: 14/517,894

(22) Filed: Oct. 19, 2014

(65) Prior Publication Data

US 2016/0110098 A1 Apr. 21, 2016

(51) Int. Cl.
*G06F 3/041* (2006.01)
*G06F 3/0488* (2013.01)

(52) U.S. Cl.
CPC .......... *G06F 3/04886* (2013.01); *G06F 2203/04803* (2013.01)

(58) Field of Classification Search
CPC .............. G06F 3/04883; G06F 3/013
USPC .................................................. 345/156–184
See application file for complete search history.

(56) References Cited

U.S. PATENT DOCUMENTS

| | | | | |
|---|---|---|---|---|
| 7,030,860 | B1 * | 4/2006 | Hsu | G06F 3/044 178/18.06 |
| 2003/0222858 | A1 * | 12/2003 | Kobayashi | G06F 3/0488 345/173 |
| 2007/0008298 | A1 * | 1/2007 | Ohta | A63F 13/06 345/173 |
| 2010/0020031 | A1 * | 1/2010 | Hwang | G06F 3/04886 345/173 |
| 2011/0254865 | A1 * | 10/2011 | Yee | G06F 3/013 345/661 |
| 2011/0267278 | A1 * | 11/2011 | Wickstrom | G06F 3/04886 345/173 |

* cited by examiner

*Primary Examiner* — Carolyn R Edwards
(74) *Attorney, Agent, or Firm* — VanLeeuwen & VanLeeuwen; Carlos Munoz-Bustamante (57) ABSTRACT

An approach is provided for establishing touch zones of soft keys of a soft keypad that is displayed on a touch-screen device. The approach identifies a fingertip size associated with a user of the touch-screen device. Touch zones of one or more keys are then established so that the size of the touch zones is based on the fingertip size.

20 Claims, 9 Drawing Sheets

TOUCH ZONES ON A SOFT KEYBOARD

BACKGROUND

Soft or on-screen keyboards (OSKs) lack tactile cues to guide finger placement for the user. This often leads to users pressing key areas in a wide or inaccurate location relative the graphically designated area of respective keys of the OSK. In turn, this creates errors and user frustration when attempting full-speed and/or "touch" or "blind" typing (typing while not looking at the keyboard). To compensate for typing inaccuracy, existing OSK solutions attempt to give the user latitude by maximizing size of a touch zone associated to a key of the OSK at times enlarging the touch zone beyond the graphically designated area for the key. These OSK solutions affect the probability of which key output occurs based on where the user is typing and ensure every contact on the keyboard will generate a character. However, there remains a notable level of variability that a user will touch a key area without tactile cues to guide the input. Traditional solutions depend heavily on language modeling and automatic word correction ("auto-correct") to help decipher what the user intended to type. State of the art word correction is at best 90% accurate with known lexicon. However, users often type proper nouns, abbreviations, acronyms, and custom lexicon that current word prediction fails to acceptably handle. An error rate greater than 10% is common with OSK typing and is unacceptable to many users when compared to full speed touch typing performance on traditional keyboards. The OSK model of catering to innate OSK typing inaccuracy is flawed as it depends on automatic, and error-prone, word correction.

SUMMARY

An approach is provided for establishing touch zones of soft keys of a soft keypad that is displayed on a touch-screen device. The approach identifies a fingertip size associated with a user of the touch-screen device. Touch zones of one or more keys are then established so that the size of the touch zones is based on the fingertip size.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
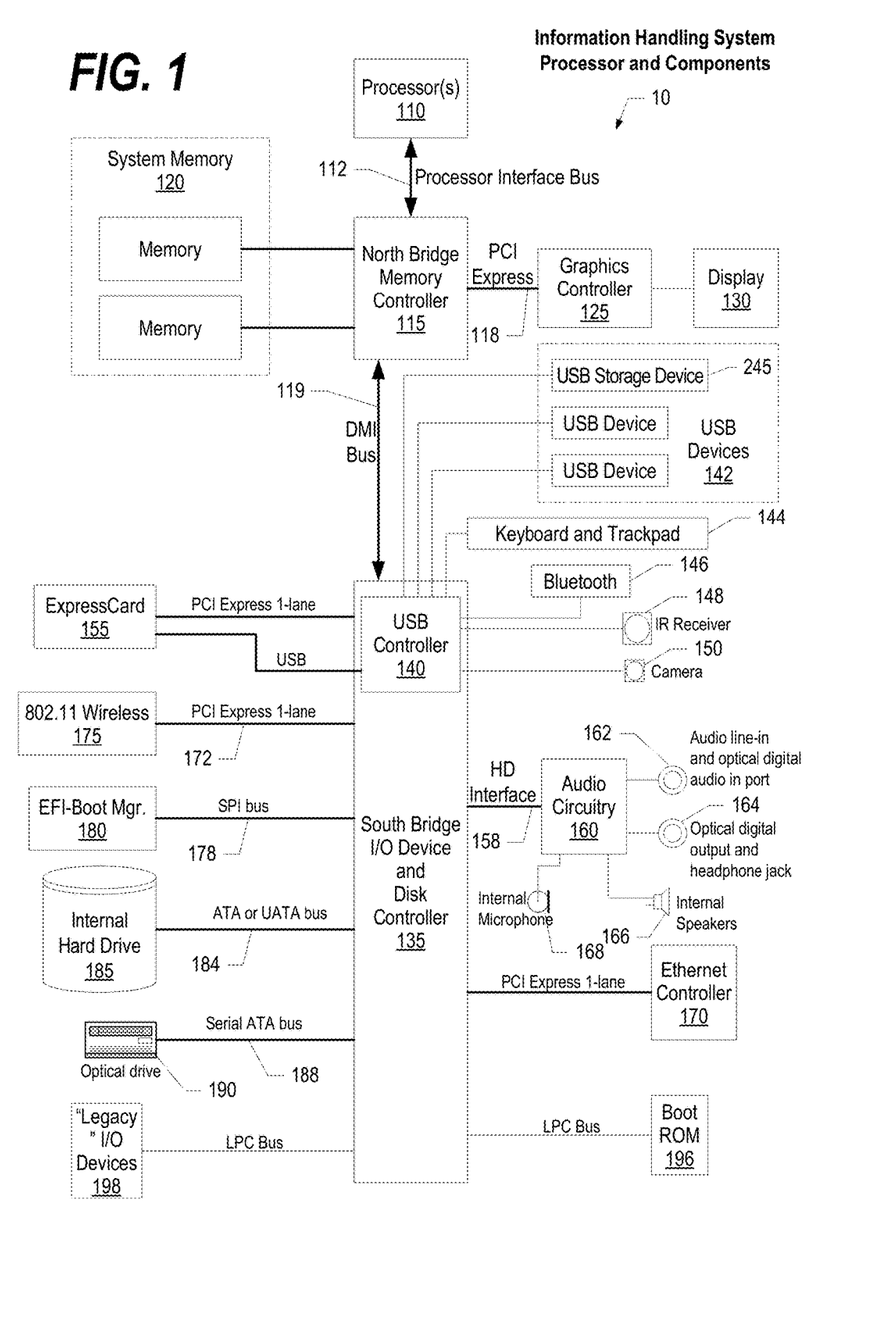
FIG. 1 is a block diagram of a data processing system in which the methods described herein can be implemented.
Figure 2:
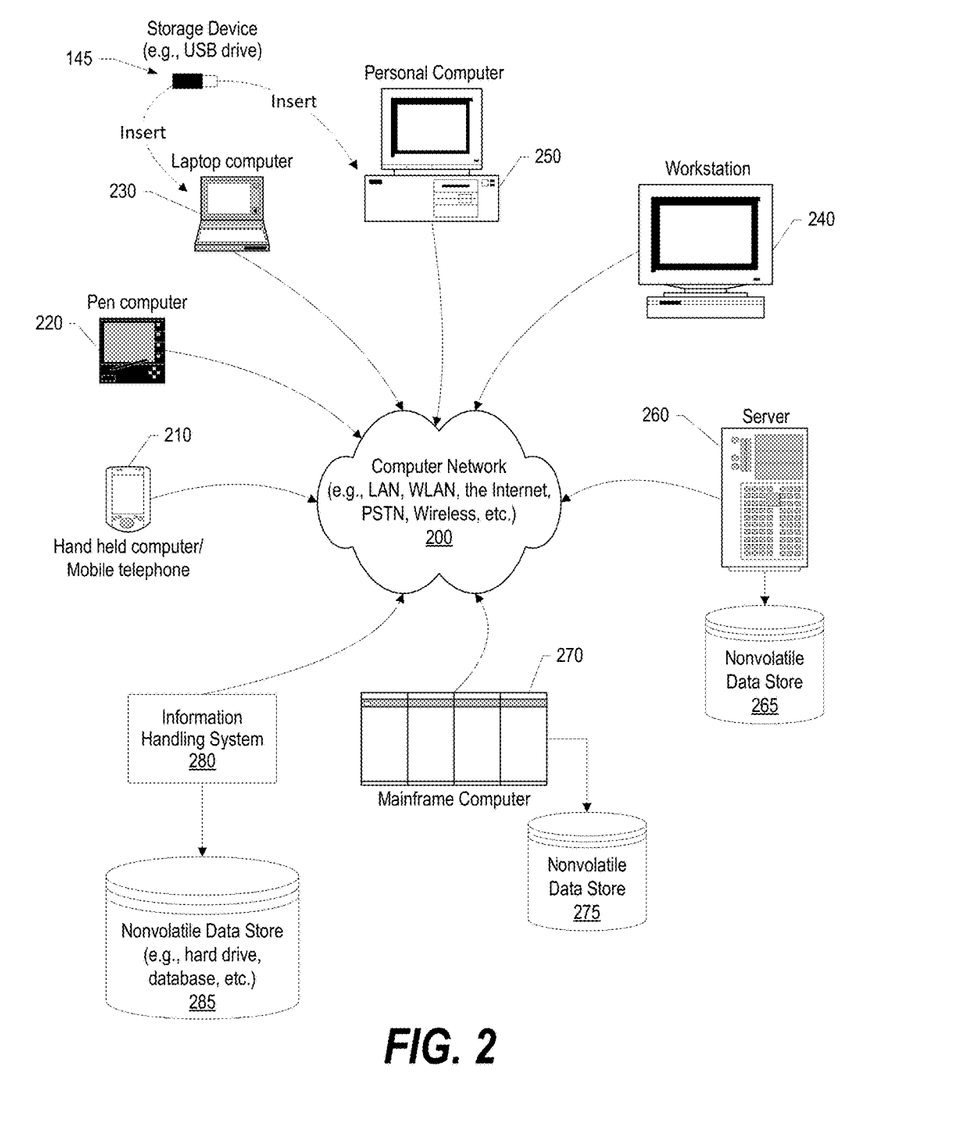
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
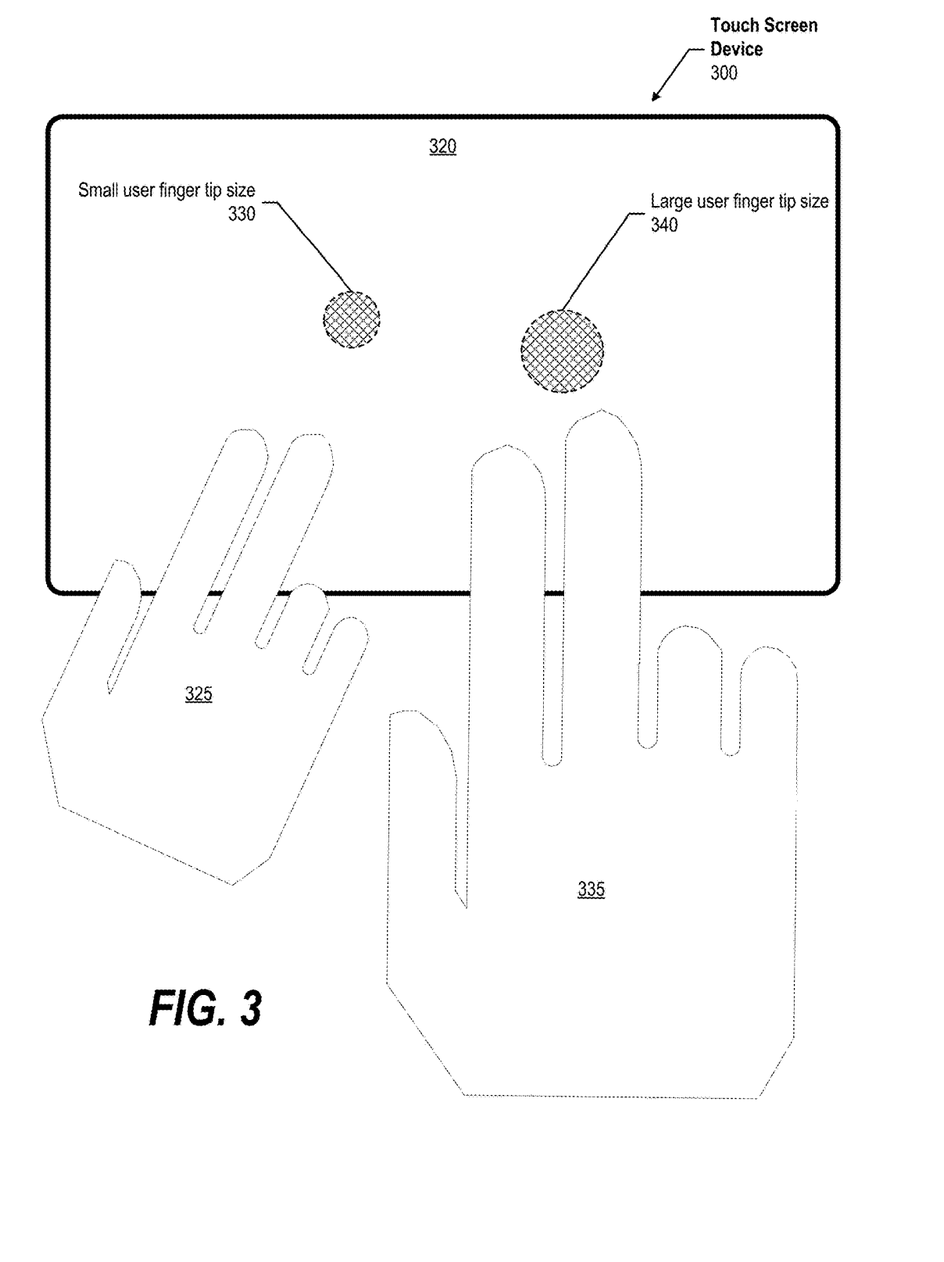
FIG. 3 is a diagram depicting different fingertip sizes obtained from different users of a touch screen device.

FIG. 3 is a diagram depicting different fingertip sizes obtained from different users of a touch screen device. Touch screen device 300 is shown being pressed by two different users, user 325 and user 335. Display surface 320 has sensors that detect touching of the surface by a user. A surface area of each user's fingertip is captured when the users' fingertips are pressed against surface 320. In the example shown, user 325 has a smaller fingertip size 330 than fingertip size 340 associated with the larger user. As will be shown in further detail in FIG. 4, the smaller fingertip size results in larger touch zones within the soft keys displayed on a soft keypad while, conversely, the larger fingertip size results in smaller touch zones within the same soft keys.

Figure 4:
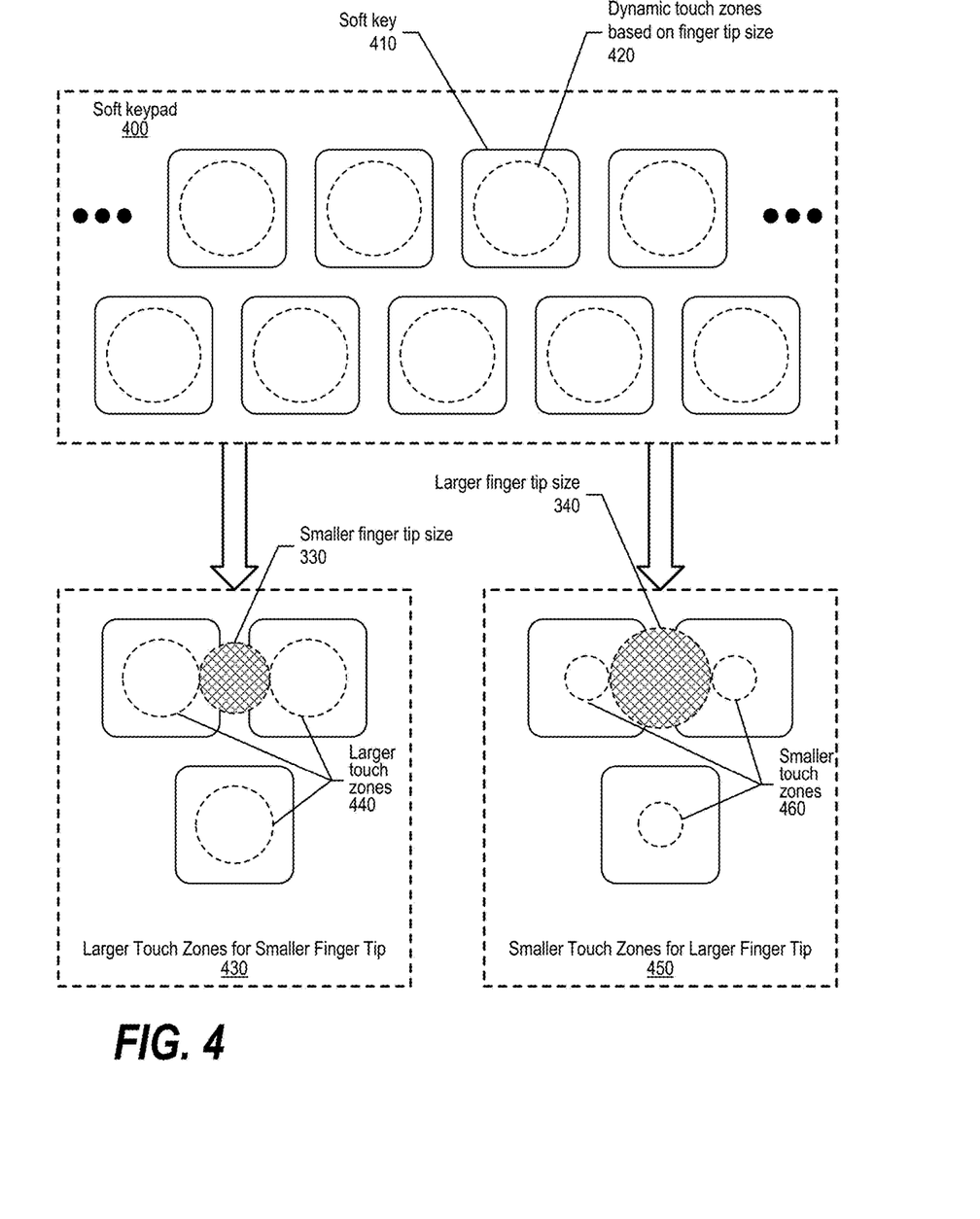
FIG. 4 is a diagram depicting dynamic touch zones created for different users based on the users' respective fingertip size.

FIG. 4 is a diagram depicting dynamic touch zones created for different users based on the users' respective fingertip size. A portion of soft keypad 400 is shown with default touch zones displayed within each of the soft keys. Soft key 410 is depicted and touch zone 420 is depicted as being within soft key 410. The size and/or border of the touch zones may not be visible on the soft key with the dashed line bordering the touch zones indicating the area within the respective soft key that the user has to touch in order have the system detect that the key was pressed. When the touch zones are large, such as depicted in default touch zone 420, the user can intend to press one key but the system detects that a different key was pressed because the user did not press within the intended touch zone. Establishing the touch zones based on the user's fingertip size makes pressing of an unintended key less likely.

Using the fingertip sizes collected in FIG. 3, the touch zones established for keys for the user with the smaller fingertip are shown in keypad portion 430, while the touch zones established for keys for the user with the larger fingertip are shown in keypad portion 450. Note that touch zones are established so that each touch zone is at least the size of the user's fingertip away from the touch zones of neighboring keys. Because of this relationship, touch zones 440 established for the user with a smaller fingertip are larger than touch zones 460 that were established for the user with a larger fingertip. The user with the smaller fingertips needs to touch the larger touch zones 440 to press the respective soft keys, while the user with the larger fingertips needs to touch the smaller touch zones 460 to press the same respective keys.

Figure 5:
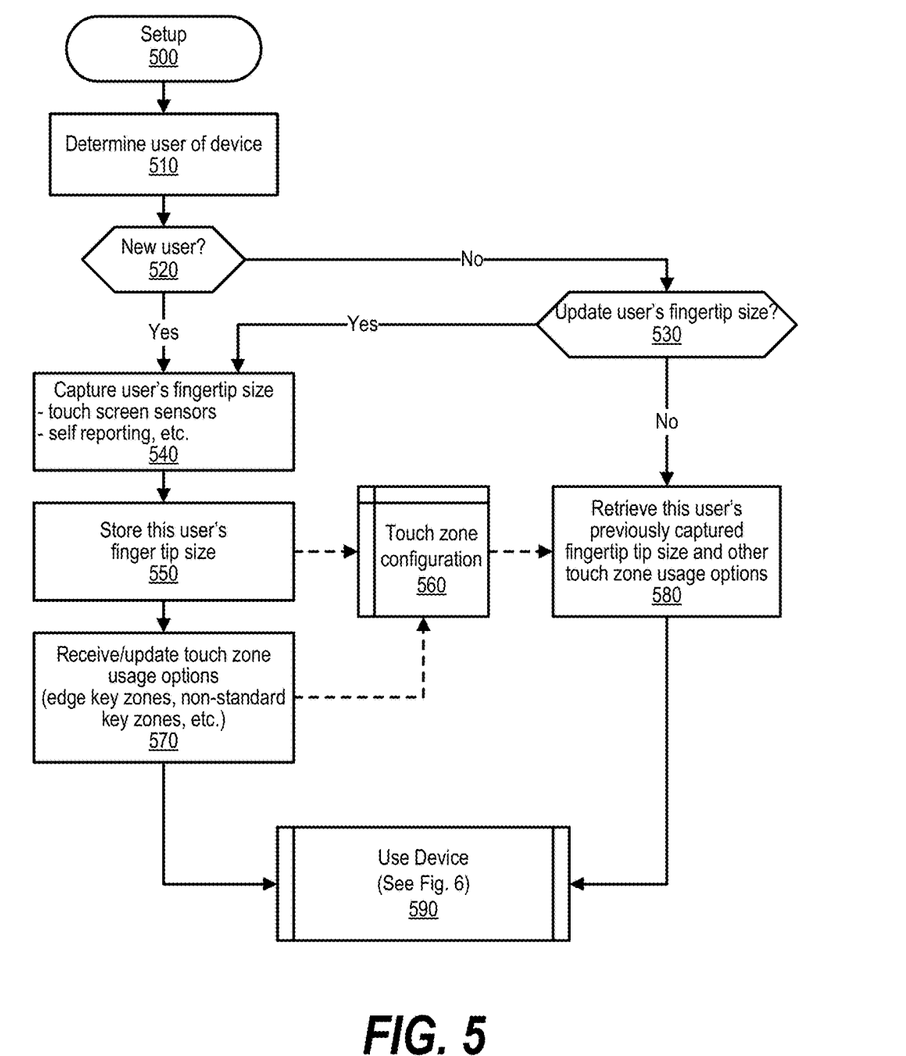
FIG. 5 is a flowchart showing steps taken by a setup process that establishes a user's fingertip size and other configuration settings.

FIG. 5 is a flowchart showing steps taken by a setup process that establishes a user's fingertip size and other configuration settings. FIG. 5 commences at 500 and shows the steps taken by a process that performs setup processing. At step 510, the process determines the user of device (e.g., user identifier/password, biometric sensors, name entry, etc.). The process determines as to whether the user is a new user of the touch-screen device (decision 520). If the user is a new user of the touch-screen device, then decision 520 branches to the 'yes' branch for new user processing performed by steps 540 through 570.

On the other hand, if the user is not a new user of the touch-screen device, then decision 520 branches to the 'no' branch for current user processing. In current user processing, the process determines as to whether the user wishes to update his or her fingertip size or other touch zone usage options (decision 530). If the user wishes to update his or her fingertip size or other touch zone usage options, then decision 530 branches to the 'yes' branch to perform steps 540 through 570.

On the other hand, if the user does not wish to update his or her fingertip size or other touch zone usage options, then decision 530 branches to the 'no' branch whereupon, at step 580, the user's previously stored fingertip size and other touch zone usage options are retrieved from nonvolatile memory 560.

At step 540, the process captures the user's fingertip size. In one embodiment, touch screen sensors in the touch screen device are used to capture the user's actual fingertip size when pressed against the touch-enabled surface of the device. In another embodiment, the user's fingertip size is self reported by the user by using a user interface (sliding bars, input text boxes, etc.) to report the size of the user's fingertip. At step 550, the process stores this user's finger tip size in nonvolatile memory 560. During subsequent uses of the device, the user's fingertip size can be retrieved from the nonvolatile memory rather than being recaptured from the user. At step 570, the process receive/updates touch zone usage options. For example, the user can indicate how touch zones on edge keys (those keys at the edge of a soft keypad) should operate, how non-standard shaped keys (e.g., larger spacebar, return keys, etc.) should operate, etc.

Figure 6:
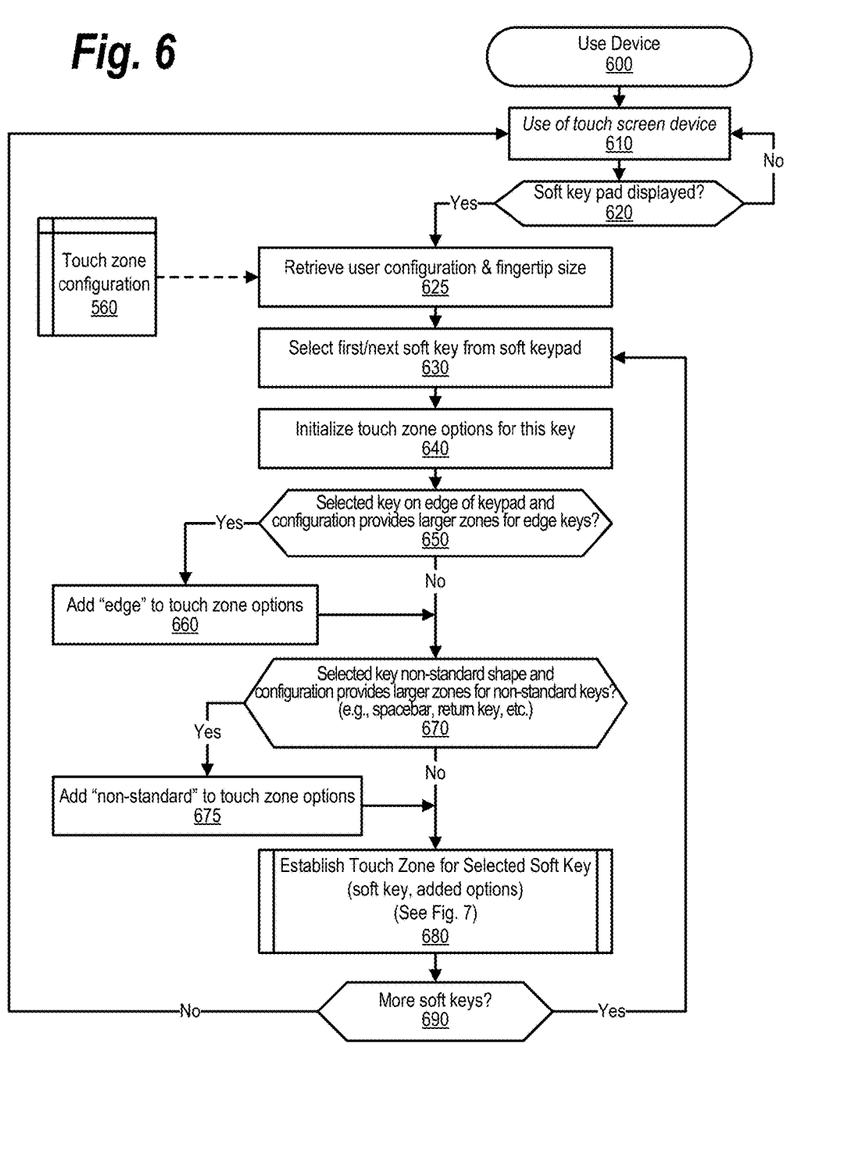
FIG. 6 is a flowchart showing steps taken during usage of a touch screen device to customize touch zones when a soft key pad is displayed.

After the user's fingertip size and other touch zone usage options have either been captured or retrieved from nonvolatile memory 560, at predefined process 590, the user uses the touch screen device (see FIG. 6 and corresponding text for processing details). During further operation of the touch screen device, one or more soft keypads may be displayed, at which time the user's fingerprint size is retrieved and used to establish the touch zones within the soft keys displayed on such soft keypads.

FIG. 6 is a flowchart showing steps taken during usage of a touch screen device to customize touch zones when a soft key pad is displayed. FIG. 6 commences at 600 and shows the steps taken while the user is using the touch screen device. At step 610, the user is depicted as using the touch screen device. The process detects as to whether a soft key pad displayed on the touch screen device (decision 620). Processing branches to the 'no' branch looping back to step 610 until a soft keypad is displayed on the device.

When a soft keypad is displayed on the device, then decision 620 branches to the 'yes' branch to establish the touch zones within the soft keys displayed in the keypad. At step 625, the process retrieves the user's touch screen configuration settings and the user's fingertip size from nonvolatile memory 560. At step 630, the process selects the first soft key displayed in the soft keypad. At step 640, the process initializes the touch zone options for this key.

The process determines as to whether the selected soft key is at an edge of the soft keypad and whether the configuration options selected by the user provides for larger touch zones for such edge keys (decision 650). If the selected soft key is at an edge of the soft keypad and the configuration options provide for larger touch zones for such edge keys, then decision 650 branches to the 'yes' branch whereupon, at step 660, an "edge" option is added to the set of touch zone options for the selected key. On the other hand, if the selected soft key is not at an edge of the soft keypad or the configuration options do not provide for larger touch zones for such edge keys, then decision 650 branches to the 'no' branch bypassing step 660.

The process next determines as to whether the selected soft key is a non-standard shaped key and whether the configuration options provides for larger zones for such non-standard keys (decision 670). If the selected soft key is a non-standard shaped key and the configuration options provides for larger zones for such non-standard keys, then decision 670 branches to the 'yes' branch whereupon, at step 675, the process adds "non-standard" the list of touch zone options for the selected key. On the other hand, if the selected soft key is not a non-standard shaped key or the configuration options do not provide for larger zones for such non-standard keys, then decision 670 branches to the 'no' branch bypassing step 675.

Figure 7:
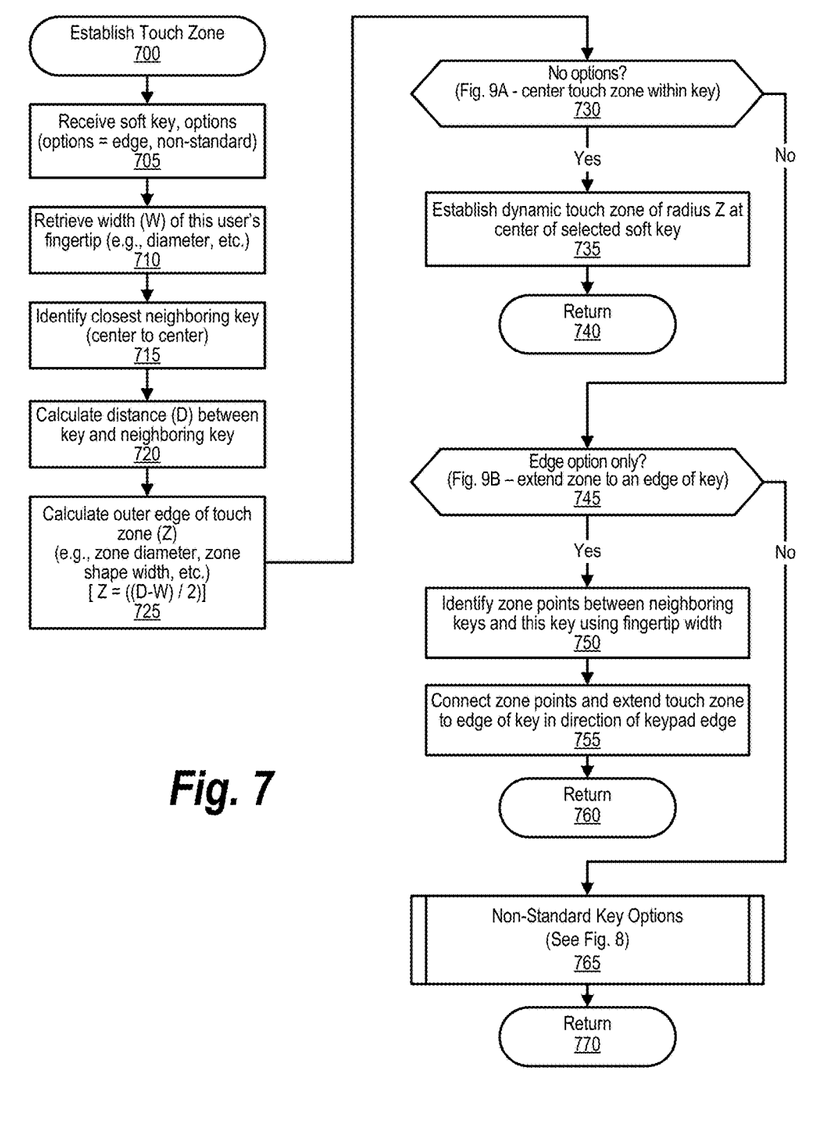
FIG. 7 is a flowchart showing steps taken to establish dynamic touch for a displayed soft key pad.

At predefined process 680, the process performs the Establish Touch Zone for Selected Soft Key routine (see FIG. 7 and corresponding text for processing details). The routine is passed the particular soft key along with any touch zone options that may have been added in step 660 and/or step 675. The process determines as to whether there are more soft keys on the soft keypad to process (decision 690). If there are more soft keys on the soft keypad to process, then decision 690 branches to the 'yes' branch which loops back to step 630 to select and process the next soft key as described above.

This looping continues until there are no more soft keys on the soft keypad to process, at which point decision 690 branches to the 'no' branch which loops back to step 610 where the user continues using the touch screen device upon which the soft keypad is displayed with touch zones established based on the user's fingertip size.

FIG. 7 is a flowchart showing steps taken to establish dynamic touch for a displayed soft key pad. FIG. 7 processing commences at 700 and shows the steps taken by a process that performs the routine that establishes dynamic touch zones within the soft keys displayed on a soft keypad. At step 705, the process receives, from the calling routine, the soft key that is being processed along with any options that apply to this soft key (e.g, edge placement, non-standard key). At step 710, the process retrieves the size, such as the width (W), of this user's fingertip (e.g., diameter, etc.). At step 715, the process identifies the closest neighboring key to this key (e.g., center of this key to the center of the neighboring key, etc.). At step 720, the process calculates the distance (D) between this key and the closest neighboring key. At step 725, the process calculates outer edge of the touch zone (Z) to establish for this key. The outer edge forms the touch zone border of this soft key and may be circular, in which case the distance is a diameter, or a different shaped polygon that uses the user's fingertip width to form the border of the touch zone so that the touch zone is based on the size of the user's fingertip. In one embodiment, the border of the touch zone established for this soft key is at least the user's fingertip size (e.g., width, etc.) away from the border of any of its neighboring keys' respective touch zones. In one embodiment, the width (radius) of this key's touch zone is the distance between the keys (D) minus the fingertip size (W) with that amount divided by two to provide the radius.

The process determines as to whether there were no options (edge, non-standard key) set for this soft key (decision 730). If there were no options set for this soft key, then decision 730 branches to the 'yes' branch, whereupon at step 735, the process establishes a dynamic touch zone of radius Z at center of selected soft key, and processing returns to the calling routine (see FIG. 6) at 740. On the other hand, if there were options set for this soft key (edge and/or non-standard key), then decision 730 branches to the 'no' branch bypassing step 735.

The process determines as to whether the options for this soft key only included an edge option (decision 745). If the options for this soft key only included an edge option, then decision 745 branches to the 'yes' branch, whereupon steps 750 and 755 are performed. At step 750, the process identifies touch zone points between the neighboring keys and this key using fingertip size so that the border of the touch zone for this soft key are at least the fingertip size away from the touch zones of neighboring keys. At step 755, the process connects the touch zone points and extend touch zone to the edge of the soft key in direction of the keypad edge, which is the side of the selected soft key that has no neighboring keys. Processing then returns to the calling routine (see FIG. 6) at 760. On the other hand, if the options did not include just an edge option, then decision 745 branches to the 'no' branch, whereupon, at predefined process 765, the process performs the Non-Standard Key Options routine (see FIG. 8 and corresponding text for processing details), after which processing returns to the calling routine (see FIG. 6) at 770.

Figure 8:
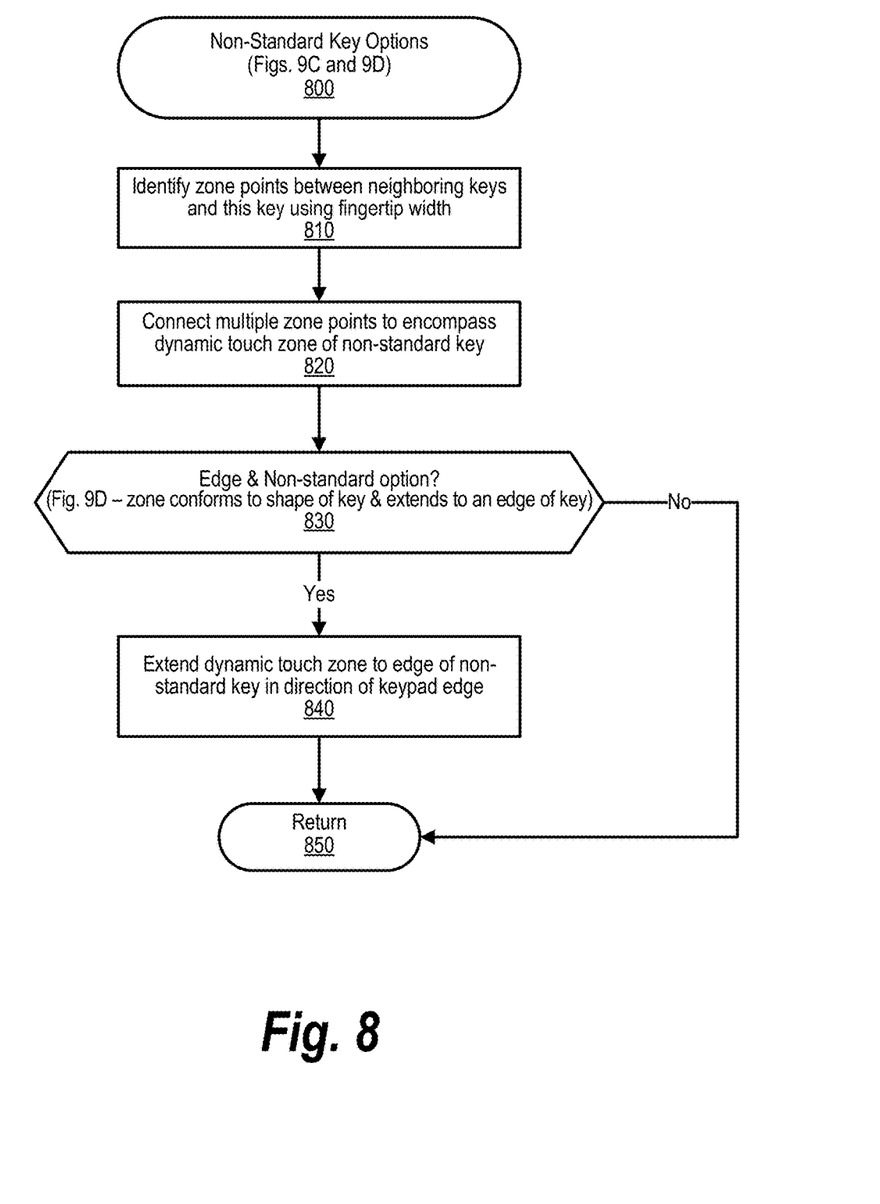
FIG. 8 is a flowchart showing steps taken to handle touch zones on non-standard soft keys included in a displayed soft key pad.

FIG. 8 is a flowchart showing steps taken to handle touch zones on non-standard soft keys included in a displayed soft key pad. This subroutine handles keys that are non-standard keys (e.g., larger keys such as space bar, return key, etc.) and also handles non-standard keys that are at the edge of the keypad.

FIG. 8 commences at 800 and shows the steps taken by a process that performs the routine that handles non-standard keys. At step 810, the process identifies touch zone points between neighboring keys and this soft key using the user's fingertip size so that the border of this soft key's touch zone is at least the fingertip size away from the borders of neighboring soft keys' touch zones. At step 820, the process connects the multiple touch zone points identified in step 810 to form a touch zone border for this non-standard soft key.

The process determines as to whether an edge option was included with the non-standard option for this key (decision 830). If an edge option was included with the non-standard option for this key, then decision 830 branches to the 'yes' branch, whereupon at step 840, the process extends the dynamic touch zone for this key to the edge of the non-standard soft key in the direction of the keypad edge (the side of this soft key that has no neighboring key(s)). On the other hand, if an edge option was not included with the non-standard option for this key, then decision 830 branches to the 'no' branch bypassing step 840. Processing then returns to the calling routine (see FIG. 7) at 850.

Figures 9A, 9B:
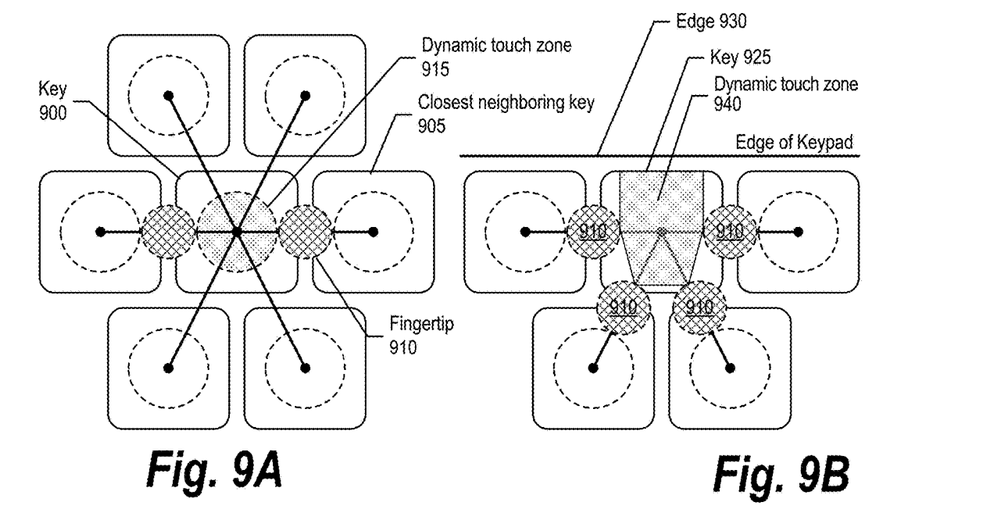
FIG. 9A depicts touch zone established in center of a soft key.
FIG. 9B depicts touch zone for a key at keypad edge.

FIG. 9A depicts touch zone established in center of a soft key. Soft key 900 is shown with multiple neighboring soft keys. From these neighboring soft keys, closest neighboring soft key 905 is identified. The distance from the center of soft key 900 to the center of neighboring soft key 905 is found. Fingertip size 910 is subtracted from this distance leaving the diameter of touch zone 915 that is established within soft key 900.

FIG. 9B depicts touch zone for a key at keypad edge. Here, soft key 925 is shown being at edge 930 of the soft keypad with no neighboring soft keys appearing above soft key 925. Fingertip size 910 is again used to identify the border of the soft key's touch zone so that the touch zone of this soft key is at least the fingertip size away from the touch zone of neighboring keys (those keys left, right, and below this key. A series of points are identified that form the touch zone border corners between this soft key and each of the neighboring soft keys. Touch zone border 940 of soft key 925 is then extended to the edge of the soft key in the direction of the keypad edge.

Figures 9C, 9D:
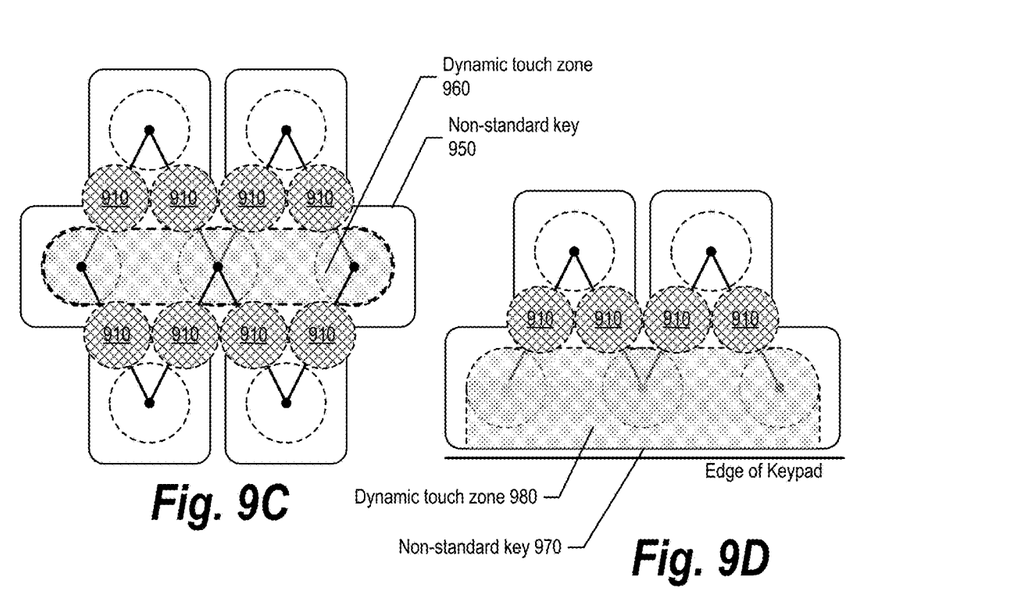
FIG. 9C depicts touch zone for a non-standard soft key.
FIG. 9D depicts touch zone for a non-standard key at keypad edge.

FIG. 9C depicts touch zone for a non-standard soft key. Here, soft key 950 is a non-standard shaped key, such as a space bar or return key. In the example shown, the non-standard key is the same width as standard (neighboring) keys but is approximately three times wider. Fingertip size 910 is used to form the touch zone border of this soft key by identifying multiple border points. Each of the border points is established between soft key 950 and a neighboring key so that border of touch zone 960 is at least the fingertip size away from the touch zone border's of the neighboring keys. Connecting the border points found between soft key 950 and the neighboring keys forms touch zone 960.

FIG. 9D depicts touch zone for a non-standard key at keypad edge. Here, non-standard soft key 970 has dynamic touch zone 980 with a border that is established by ensuring that the border is at least fingertip size 910 from the touch zone borders of neighboring keys, as discussed in reference to FIG. 9C. However, unlike FIG. 9C, in FIG. 9D, there are no soft keys below soft key 970, so the border of touch zone 980 is extended to the edge of soft key 970 in the direction where no neighboring keys are found.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
displaying, on a display of a touch-screen device, a soft keypad that comprises a plurality of soft keys;
identifying a fingertip size associated with a user of the touch-screen device; and
establishing one or more touch zones, wherein each of the touch zones is within one of the soft keys, wherein a size of at least one of the touch zones is based on the fingertip size, and wherein the size of the touch zone reduces as the fingertip size increases.

2. The method of claim 1 further comprising:
selecting one of the soft keys with a selected touch zone within the selected soft key, wherein the selected soft key has a plurality of neighboring soft keys that each have one of the touch zones within each of the neighboring soft keys; and
establishing the selected touch zone so that a border of the selected touch zone is at least a width of the fingertip size from any of the touch zones within any of the neighboring soft keys.

3. The method of claim 2 further comprising:
determining that an edge of the selected soft key is void of any neighboring soft keys; and
establishing the selected touch zone so that the border of the selected touch zone extends towards the edge of the selected soft key.

4. The method of claim 1 further comprising:
establishing the touch zones within each of the soft keys so that all borders of all of the touch zones are at least the fingertip size away from any border of any of the other touch zones.

5. The method of claim 1 further comprising:
identifying the fingertip size by:
detecting a fingertip of the user of the touch-screen device pressed against a screen surface of the touch screen device; and
measuring the user's fingertip size based on an area of the screen surface occupied by the fingertip pressed against the screen surface.

6. The method of claim 5 further comprising:
saving, in a nonvolatile memory, the fingertip size resulting from the measuring;
removing the displayed soft keypad from the display;
displaying a second keypad after removal of the displayed soft keypad;
re-identifying the fingertip size of the user by retrieving the saved fingertip size from the nonvolatile memory; and
re-establishing the touch zones using the fingertip size retrieved from the nonvolatile memory.

7. The method of claim 1 further comprising:
identifying the fingertip size by:
receiving a fingertip size estimate from the user at a user interface displayed on the touch-screen device;
storing, in a nonvolatile memory area, the fingertip size estimate as the fingertip size; and
retrieving the stored fingertip size from the nonvolatile memory area prior to the establishing.

8. An information handling system comprising:
one or more processors;
a touch-screen display accessible by at least one of the processors;
a memory coupled to at least one of the processors; and
a set of instructions stored in the memory and executed by at least one of the processors to:
display, on the touch screen display, a soft keypad that comprises a plurality of soft keys;
identify a fingertip size associated with a user of the touch-screen device; and
establish one or more touch zones, wherein each of the touch zones is within one of the soft keys, wherein a size of at least one of the touch zones is based on the fingertip size, and wherein the size of the touch zone reduces as the fingertip size increases.

9. The information handling system of claim 8 wherein the set of instructions comprise additional instructions effective to:
select one of the soft keys with a selected touch zone within the selected soft key, wherein the selected soft key has a plurality of neighboring soft keys that each have one of the touch zones within each of the neighboring soft keys; and
establish the selected touch zone so that a border of the selected touch zone is at least a width of the fingertip size from any of the touch zones within any of the neighboring soft keys.

10. The information handling system of claim 9 wherein the set of instructions comprise additional instructions effective to:
determine that an edge of the selected soft key is void of any neighboring soft keys; and
establish the selected touch zone so that the border of the selected touch zone extends towards the edge of the selected soft key.

11. The information handling system of claim 8 wherein the set of instructions comprise additional instructions effective to:
establish the touch zones within each of the soft keys so that all borders of all of the touch zones are at least the fingertip size away from any border of any of the other touch zones.

12. The information handling system of claim 8 wherein the set of instructions comprise additional instructions effective to:
identify the fingertip size by:
detect a fingertip of the user of the touch-screen device pressed against a screen surface of the touch screen device; and
measure the user's fingertip size based on an area of the screen surface occupied by the fingertip pressed against the screen surface.

13. The information handling system of claim 12 wherein the set of instructions comprise additional instructions effective to:
save, in a nonvolatile memory included in the memory, the fingertip size resulting from the measurement of the user's fingertip size;
remove the displayed soft keypad from the display;
display a second keypad after removal of the displayed soft keypad;
re-identify the fingertip size of the user by retrieving the saved fingertip size from the nonvolatile memory; and
re-establish the touch zones using the fingertip size retrieved from the nonvolatile memory.

14. The information handling system of claim 8 wherein the set of instructions comprise additional instructions effective to:
identify the fingertip size by:
receive a fingertip size estimate from the user at a user interface displayed on the touch-screen device;
store, in a nonvolatile memory area included in the memory, the fingertip size estimate as the fingertip size; and
retrieve the stored fingertip size from the nonvolatile memory area prior to the establishing.

15. A computer program product comprising:
a non-transitory computer readable storage medium comprising a set of computer instructions, the computer instructions effective to:
  display, on a display of a touch-screen device, a soft keypad that comprises a plurality of soft keys;
  identify a fingertip size associated with a user of the touch-screen device; and
  establish one or more touch zones, wherein each of the touch zones is within one of the soft keys, wherein a size of at least one of the touch zones is based on the fingertip size, and wherein the size of the touch zone reduces as the fingertip size increases.

16. The computer program product of claim 15 wherein the set of instructions comprise additional instructions effective to:
  select one of the soft keys with a selected touch zone within the selected soft key, wherein the selected soft key has a plurality of neighboring soft keys that each have one of the touch zones within each of the neighboring soft keys; and
  establish the selected touch zone so that a border of the selected touch zone is at least a width of the fingertip size from any of the touch zones within any of the neighboring soft keys.

17. The computer program product of claim 16 wherein the set of instructions comprise additional instructions effective to:
  determine that an edge of the selected soft key is void of any neighboring soft keys; and
  establish the selected touch zone so that the border of the selected touch zone extends towards the edge of the selected soft key.

18. The computer program product of claim 15 wherein the set of instructions comprise additional instructions effective to:
  establish the touch zones within each of the soft keys so that all borders of all of the touch zones are at least the fingertip size away from any border of any of the other touch zones.

19. The computer program product of claim 15 wherein the set of instructions comprise additional instructions effective to:
  identify the fingertip size by:
    detect a fingertip of the user of the touch-screen device pressed against a screen surface of the touch screen device; and
    measure the user's fingertip size based on an area of the screen surface occupied by the fingertip pressed against the screen surface.

20. The computer program product of claim 15 wherein the set of instructions comprise additional instructions effective to:
  identify the fingertip size by:
    receive a fingertip size estimate from the user at a user interface displayed on the touch-screen device;
    store, in a nonvolatile memory area, the fingertip size estimate as the fingertip size; and
    retrieve the stored fingertip size from the nonvolatile memory area prior to the establishing.

* * * * *